United States Patent
Sinha et al.

(10) Patent No.: US 11,711,282 B2
(45) Date of Patent: Jul. 25, 2023

(54) TCP/IP SOCKET RESILIENCY AND HEALTH MANAGEMENT

(71) Applicant: Capital One Services, LLC, McLean, VA (US)

(72) Inventors: Sheo Raj Sinha, Henrico, VA (US); Senthil K. Suriyanarayanan, Glen Allen, VA (US); Harold A. Sell, Glen Allen, VA (US); Robert C. Stettler, Powhatan, VA (US); Zachary Mcauliffe, Glen Allen, VA (US); Stephanie M. King, Glen Allen, VA (US); Kyle Heide, Midlothian, VA (US); Chris Fanis, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 75 days.

(21) Appl. No.: 17/124,055

(22) Filed: Dec. 16, 2020

(65) Prior Publication Data
US 2022/0191116 A1   Jun. 16, 2022

(51) Int. Cl.
*H04L 43/0811* (2022.01)
*H04L 67/1008* (2022.01)

(52) U.S. Cl.
CPC ...... *H04L 43/0811* (2013.01); *H04L 67/1008* (2013.01)

(58) Field of Classification Search
CPC ............ H04L 43/0811; H04L 67/1008; H04L 67/1004; H04L 43/00; H04L 43/02;
(Continued)

(56) References Cited

U.S. PATENT DOCUMENTS 6,738,811 B1 * 5/2004 Liang .................... H04L 41/147
                                                      709/224
7,281,045 B2 * 10/2007 Aggarwal ........... H04L 67/1008
                                                      709/228
(Continued)

OTHER PUBLICATIONS

Anupamvarghese, ISO 8583. An introduction. Plain and Simple; Jan. 14, 2016, https://medium.com/plain-and-simple-series/all-things-tech-beautiful-iso-8583-an-introduction-plain-and-simple-21eb62455b28.*

*Primary Examiner* — Madhu Woolcock
(74) *Attorney, Agent, or Firm* — Sterne, Kessler, Goldstein & Fox P.L.L.C.

(57) ABSTRACT

Disclosed herein are system, method, and apparatus for account inheritance. The method performed at an application server includes receiving, via an application programming interface (API), data information received by each authorization gateway of a plurality of authorization gateways. The method includes performing calculation of an overall health of each authorization gateway of the plurality of authorization gateways based on a predetermined value of a weight assigned to each server of the plurality of servers and the value of service level corresponding to each server of the plurality of servers. The method includes balancing load of each authorization gateway of the plurality of authorization gateways by routing at least one client request message to a set of one or more authorization gateways of the plurality of authorization gateways based on the calculated overall health of each authorization gateway of the plurality of authorization gateways that is above a specific threshold value.

20 Claims, 3 Drawing Sheets

(58) Field of Classification Search
CPC ............. H04L 43/0817; H04L 43/0876; H04L 43/091; H04L 43/16; H04L 43/04
USPC ......................................................... 709/224
See application file for complete search history.

(56) References Cited

U.S. PATENT DOCUMENTS

| | | | | |
|---|---|---|---|---|
| 8,225,119 | B2* | 7/2012 | Jain | G06F 9/5094 |
| | | | | 713/323 |
| 8,335,851 | B1* | 12/2012 | Vendrow | G06F 8/60 |
| | | | | 700/99 |
| 9,009,289 | B1* | 4/2015 | Jacob | H04L 67/1029 |
| | | | | 709/224 |
| 10,142,241 | B1* | 11/2018 | VanLoon | H04L 47/225 |
| 10,313,211 | B1* | 6/2019 | Rastogi | H04L 41/142 |
| 10,387,287 | B1* | 8/2019 | Wu | G06F 11/3024 |
| 10,474,548 | B2 | 11/2019 | Sanakkayala et al. | |
| 10,554,518 | B1* | 2/2020 | Troy de Freitas | H04L 41/065 |
| 10,594,562 | B1* | 3/2020 | Rastogi | H04L 41/0896 |
| 10,630,593 | B2 | 4/2020 | Paramasivam | |
| 10,686,683 | B2 | 6/2020 | Jalan et al. | |
| 10,693,952 | B2* | 6/2020 | Waltz | G06F 16/27 |
| 10,834,189 | B1* | 11/2020 | Chopra | H04L 67/1012 |
| 2002/0087612 | A1* | 7/2002 | Harper | G06F 9/4856 |
| | | | | 718/100 |
| 2002/0198937 | A1* | 12/2002 | Diwan | H04L 67/1001 |
| | | | | 709/227 |
| 2003/0120593 | A1* | 6/2003 | Bansal | H04L 65/765 |
| | | | | 705/36 R |
| 2003/0220990 | A1* | 11/2003 | Narayanan | H04L 9/40 |
| | | | | 709/227 |
| 2004/0010586 | A1* | 1/2004 | Burton | H04L 41/0893 |
| | | | | 709/224 |
| 2004/0205219 | A1* | 10/2004 | Li | H04L 65/1043 |
| | | | | 709/231 |
| 2004/0267965 | A1* | 12/2004 | Vasudevan | H04L 67/565 |
| | | | | 709/250 |
| 2006/0161471 | A1* | 7/2006 | Hulen | G06Q 10/06393 |
| | | | | 705/7.39 |
| 2006/0230307 | A1* | 10/2006 | Barlow | G06F 11/2028 |
| | | | | 714/11 |
| 2007/0074220 | A1* | 3/2007 | Edwards | H04M 3/5237 |
| | | | | 718/104 |
| 2007/0130341 | A1* | 6/2007 | Ma | H04L 67/1001 |
| | | | | 714/E11.207 |
| 2007/0180116 | A1* | 8/2007 | Kim | H04L 67/1029 |
| | | | | 709/226 |
| 2008/0263401 | A1* | 10/2008 | Stenzel | H04L 41/5012 |
| | | | | 714/31 |
| 2008/0320075 | A1* | 12/2008 | Livshits | H04L 63/145 |
| | | | | 709/203 |
| 2009/0028161 | A1* | 1/2009 | Fullarton | H04L 47/821 |
| | | | | 370/395.41 |
| 2010/0131946 | A1* | 5/2010 | Degaonkar | H04L 43/0817 |
| | | | | 718/1 |
| 2010/0262695 | A1* | 10/2010 | Mays | H04L 67/1008 |
| | | | | 709/224 |
| 2011/0153810 | A1* | 6/2011 | Raja | H04L 67/1029 |
| | | | | 718/1 |
| 2011/0179176 | A1* | 7/2011 | Ravichandran | G06Q 30/02 |
| | | | | 709/226 |
| 2012/0117399 | A1* | 5/2012 | Chan | G06F 1/3287 |
| | | | | 713/320 |
| 2012/0272245 | A1* | 10/2012 | Ryman | G06F 9/5027 |
| | | | | 718/100 |
| 2013/0138806 | A1* | 5/2013 | Gohad | G06F 9/5072 |
| | | | | 709/224 |
| 2013/0166447 | A1 | 6/2013 | Theado et al. | |
| 2014/0372627 | A1* | 12/2014 | Axelrod | G06F 11/3041 |
| | | | | 709/241 |
| 2015/0178137 | A1* | 6/2015 | Gordon | G06F 9/5061 |
| | | | | 709/226 |
| 2015/0180719 | A1* | 6/2015 | Wu | G06F 9/5083 |
| | | | | 709/224 |
| 2016/0239336 | A1* | 8/2016 | Bingham | G06F 9/45558 |
| 2016/0313780 | A1* | 10/2016 | Stewart | G06F 9/5094 |
| 2016/0337264 | A1* | 11/2016 | Murashko | H04L 67/63 |
| 2017/0034036 | A1* | 2/2017 | Kohan | H04L 67/51 |
| 2017/0123873 | A1* | 5/2017 | Baddourah | G06F 11/0751 |
| 2018/0046928 | A1* | 2/2018 | Jang | H04L 63/1416 |
| 2018/0139305 | A1* | 5/2018 | Thibeault | H04L 67/1004 |
| 2019/0073365 | A1* | 3/2019 | Jamshidi | G06F 16/986 |
| 2019/0220298 | A1* | 7/2019 | Jiao | G06F 16/9024 |
| 2019/0317754 | A1* | 10/2019 | Mosquera | G06F 11/3664 |
| 2020/0005124 | A1 | 1/2020 | Sengupta et al. | |
| 2020/0097349 | A1* | 3/2020 | Mahindru | G06F 11/0793 |
| 2020/0218561 | A1* | 7/2020 | Lal | H04L 67/1008 |
| 2020/0280519 | A1* | 9/2020 | Sharifi Mehr | H04L 63/0823 |
| 2020/0389516 | A1* | 12/2020 | Parekh | G06F 9/5077 |
| 2022/0070271 | A1* | 3/2022 | Vasiliauskas | G06N 5/01 |

* cited by examiner

TCP/IP SOCKET RESILIENCY AND HEALTH MANAGEMENT

BACKGROUND

The health of a transmission control protocol/internet protocol (TCP/IP) socket is determined by an application to which it is connected. If the socket is connected, the TCP/IP connection is considered healthy and is believed to be ready for serving traffic. Accordingly, the application corresponding to the TCP/IP socket connection is also assumed to be up and running. Such an application is understood to be ready to accept a plurality of client requests from a plurality of clients. However, when the application is part of a multi-layered application framework, the TCP/IP socket connection cannot be assumed to serve the traffic because socket connection to other applications or a back-end component may not be healthy. Accordingly, when the multi-layered application framework is deployed in a cloud network, multiple instances are running on the cloud network in different geographical zones or regions, determining the availability of a TCP/IP socket connection for service traffic poses a significant challenge and affects network performance adversely.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Various embodiments of this disclosure will be discussed with respect to the corresponding figures.

Figure 1:
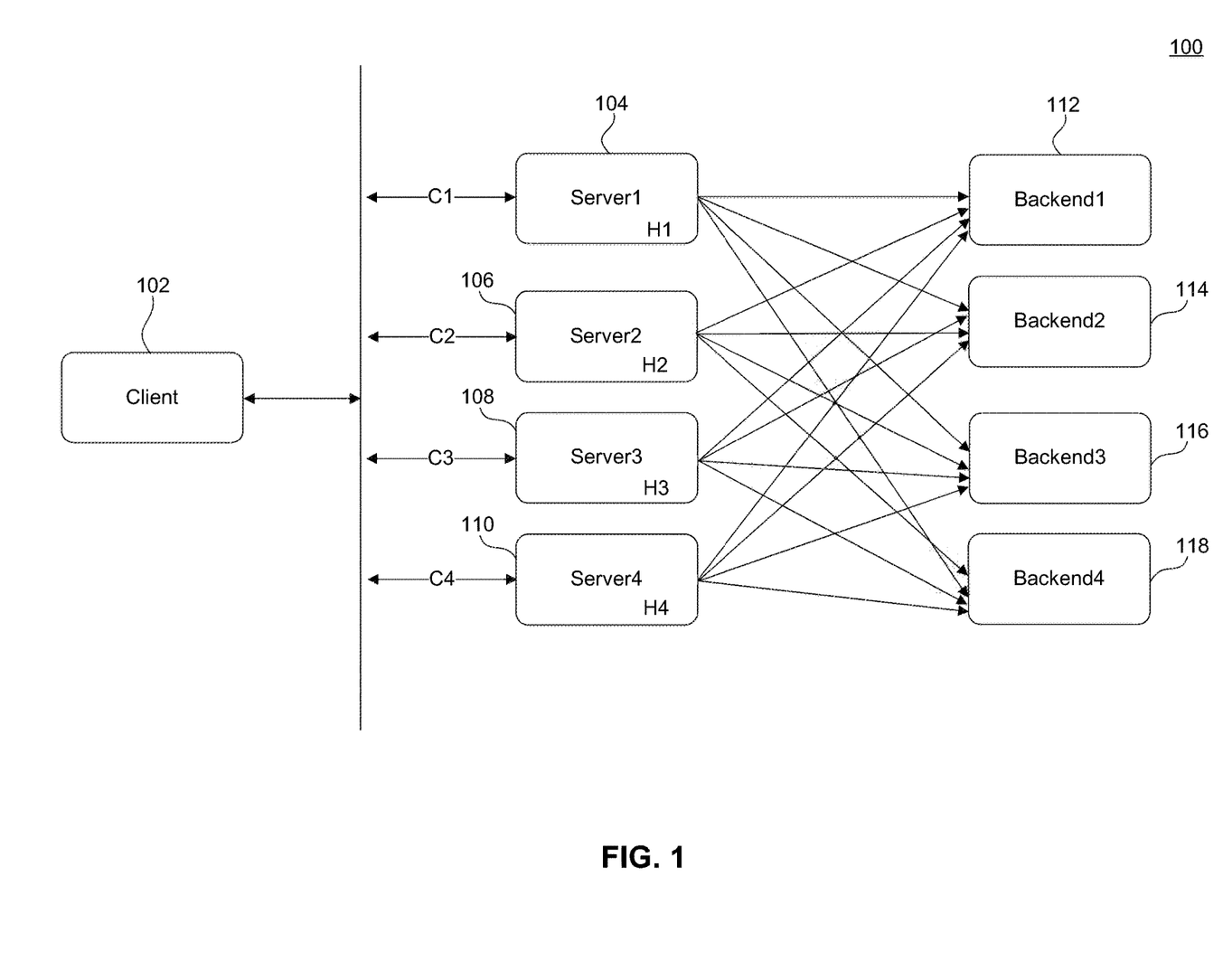
FIG. 1 illustrates a block diagram of an example network environment, according to some embodiments.

FIG. 1 illustrates a block diagram of an example network environment in which various embodiments described in this disclosure may be practiced. The example network environment includes a client 102 of a plurality of clients, a plurality of servers including a server1 104, a server2 106, a server3 108, and a server4 110. While only four servers, server1 104 through server4 110 are shown in FIG. 1, the total number of servers at a front-end of the example network on the server-side may be more or less than the number of servers shown in FIG. 1. Each of the plurality of servers may receive a plurality of requests from one or more of a plurality of clients. The example network environment is a multi-layered application network. Accordingly, the server1 104, the server 106, the server3 108, and the server4 110 each may be deployed with an application. Each of the server1 104, the server2 106, the server3 108, and the server4 110 may be running an application instance. By way of a non-limiting example, the server1 104, the server2 106, the server3 108, and the server4 110 may be deployed in different geographical areas.

In some embodiments, by way of a non-limiting example, the application running on the server1-server4 104-110 may be an authorization gateway application. By way of a non-limiting example, the authorization gateway application may be a credit card authorization application, and a merchant of a plurality of merchants may send credit card authorization requests to the authorization gateway application. The authorization gateway application may expose a plurality of TCP/IP sockets for the plurality of merchants to connect and send authorizations requests to the authorization gateway application. A TCP/IP socket is one endpoint of a two-way communication link between two programs running on the network. A socket is bound to a port number so that the TCP layer can identify the application that data is destined to be sent to. An endpoint is a combination of an IP address and a port number. A connection established using a TCP/IP socket is a persistent connection because a plurality of requests may be sent over a single TCP/IP socket without destroying and establishing the TCP/IP socket. Accordingly, the merchant may send a plurality of credit card authorization requests and receive corresponding responses using the persistent TCP/IP sockets connections established between the merchant's server and the authorization gateway application. By way of a non-limiting example, the response may be an approval or rejection of the credit card authorization request. Because the merchant may send the credit card authorization requests without a need to re-establish the TCP/IP socket connection for each credit card authorization request, it may save time to complete the transaction. In the present disclosure, various embodiments are described using a merchant as an example, however the disclosure is not limited to the merchant only, and can also be applicable for other entities which may use TCP/IP protocol for various requests and responses, and may require persistent TCP/IP connection.

In some embodiments, as stated above, the authorization gateway application may be deployed on the cloud on a plurality of zones and regions. By way of a non-limiting example, the authorization gateway application may have more than one instance; each instance of the authorization gateway application may be in a different geographic region. Accordingly, in case of a natural calamity or other emergencies, not all instances of the authorization gateway application may be affected simultaneously. Thereby, the authorization gateway application may be more resilient and serve credit card authorization requests from the plurality of merchants without adverse service impact. Accordingly, there may be multiple instances of the authorization gateway application running on the cloud, and each instance of the multiple instances may expose a TCP/IP socket connection for receiving the plurality of credit card authorization requests and send corresponding responses in return.

In some embodiments, each application instance of the multiple instances of the application may provide a health endpoint, which may be a separate connection established using, for example, TCP/IP or UDP protocol, to receive additional information about the application health, including service level. In addition to the health endpoint, the application instance may also provide a sign-on and/or a sign-off endpoint. The sign-on and/or sign-off endpoint may be used for communicating sign-on and/or sign-off signals to the merchant's server connected to the authorization gateway application instances via TCP/IP sockets.

In some embodiments, as shown in FIG. 1, each server of the servers server1-server4 104-110 has a connection to a plurality of back-end components, for example, a backend1 112, a backend2 114, a backend3 116, and a backend4 118.

In the multi-layered application framework 100 of FIG. 1, the health of the application and the plurality of back-end components may be weighted and reported as a single numerical value referred to as a service level.

In some embodiments, the service level may be a numeric value from 0.0 to 1.0 and may indicate the health of the server, for example, the server1 104, the server2 106, the server3 108, and/or the server4 110. A value of 0.0 may indicate a full outage of service. In other words, when the service level of value 0.0 is reported, the server may be interpreted to be completely dysfunctional to serve traffic and cannot perform even degraded functional logic. A value of 1.0 may indicate the server is in perfect health and ready to serve traffic without any degradation to the functional logic. A value of less than 1 may indicate the service is experiencing some issue, and there is some service degradation. Accordingly, when the service level value is between 0.0 and 1.0, the server may be functioning with some degraded functional logic. By way of a non-limiting example, the degradation may be in the form of limited throughput, increased response time, or limited decision capability, and/or reduced functional capabilities, etc. The service level data may provide a suppression function, discussed in detail below, with the information it needs to ensure that only the healthiest servers get traffic.

The service level value may be communicated using TCP/IP based IOS8583 network messages, i.e., MTI 0800, to determine whether the system is offline, meaning the server is unable to serve any data packet regarding the requested service, or online, meaning the server is available to serve at the full available capacity.

Accordingly, the aggregated health scores of all of the authorization servers may be calculated to determine the best set of servers processing the transactions. The aggregated health score of each server may be calculated based on the health of the application and the health of all its back-end applications. The application may be considered healthy if it can process the credit card authorization request. The health score may indicate the level of service that can be provided.

Accordingly, the traffic may be sent only to the fully healthy servers, i.e., servers with a service level value 1.0. The health score of each server may be analyzed for determining whether the server should be removed from the active pool of servers because the server is reporting a service level value of a value between 0 and a preconfigured threshold value of service level value. For example, if the service level value is determined to be 0.7, which is less than the preconfigured threshold value of service level value 0.8, then the server may be removed from the active pool of servers. All servers that are considered unhealthy may be placed offline using ISO8583 network messages.

In some embodiments, by way of a non-limiting example, if no server is reporting a service level value of 1.0, then servers with a service level value above a certain threshold value may be placed in a pool of active servers for servicing network traffic.

In some embodiments, TCP/IP ISO8583 messages may be used to send request and response messages from the client 102 and any of the servers 104-110. In addition, TCP/IP ISO8583 based network messages may be used to put a server in online and/or offline status to include/exclude the server from a pool of active servers. For example, the network messages may be one or more of a Sign-On request and response messages, a Sign-Off request, and a response message. Various mandatory fields of the Sign-On and/or Sign-off request and response messages are discussed below.

In some embodiments, the Sign-On message may be used to indicate the server is active, i.e., the server is commissioned for servicing network traffic. By way of a non-limiting example, the Sign-On request message may be based on an industrial standard for financial transaction card originated interchange messaging (ISO 8583 standard), which is herein incorporated by reference for all purposes. ISO 8583 standard is based on TCP/IP protocol. The message body of the TCP/IP message based on the ISO 8583 standard may include a plurality of data element fields. The data element fields may be an ordered list of data element fields. The Sign-On request message may have a field number 0 that indicates a message type indicator (MTI) Code. The MTI code may have a value of 0800 in which the most significant digit indicates a version number, and the three least significant digits indicate the message type. The message type value 800 indicates the message is a network management message. The Sign-On message may have a fixed structure of various data element fields. By way of a non-limiting example, a data element field number 7 may be used to indicate Transaction Date and Time. The data element field number 7 may specify the value of current date and time in MMDDhhmmss format, for example. Similarly, data field number 11 may indicate a system trace audit number. The system trace audit number field may be used to match a request and response pair and may have a value of a 6-digit sequence number. Data element field number 70 may be a proprietary data element used to convey network management information code. The network management information code may identify Service-On status of a server. The Service-On status may have a value of 001 and 071 for Mastercard and Visa, respectively. Similar to the Sign-On request message, the Sign-On response message may include an MTI code value, data element field number 7 that indicates Transaction Date and Time, data element field number 11 that indicates system trace audit number, and data element field number 70 that indicates network management information code. The MTI Code value may be set to 0810 for the Sign-On response message. Similarly, the Sign-On response message may have a value of the network management information code set to 001 and 071 for Visa and Mastercard, respectively.

In some embodiments, the Sign-Off message may be used to indicate the server is inactive, i.e., the server is decommissioned or unavailable for servicing network traffic. By way of a non-limiting example, the Sign-Off request message may be based on the ISO 8583 standard. The Sign-Off request may have a field number 0 that indicates a message type indicator (MTI) Code. The MTI code may have a value of 0800 in which the most significant digit indicates a version number, and the three least significant digits indicate the message type. The message type value 800 indicates the message is a network management message. As stated above with reference to the Sign-On request message, the most significant digit indicates a version number, and the three least significant digits indicate the message type. The message type value 800, as stated above, indicates that the Sign-Off request message is also a network management type message. Similar to the Sign-On request message, the Sign-Off request message may include a data element field number 7 that indicates Transaction Date and Time. The value of the data element field number 7 may indicate current date and time in MMDDhhmmss format. Data element field number 11 of the Sign-Off request may indicate system trace audit number with a value of 6-digit sequence number. The value of the data element field number 11 may be unique to a pair of Sign-Off request and Sign-Off response message. Data element field number 70 may be a proprietary field and may indicate network management information code that identifies the Service-Off status of a server. The value of the network management information code may be set to 002 and 072 for Mastercard and Visa, respectively. Similar to the Sign-Off request message, the Sign-Off response message may include an MTI code value, data element field number 7 that indicates Transaction Date and Time, data element field number 11 that indicates system trace audit number, and data element field number 70 that indicates network management information code. The Sign-Off response message may have a value of the MTI Code set to 0810, and the network management information code may have a value 002 and 072 for Visa and Mastercard, respectively.

In some embodiments, server service level calculation may be performed considering all back-end applications. Each back-end component may be given a weighted value, for example, B1 wt, B2 wt, etc., between 0 and 1, both inclusive, and may have a service level value between 0.0 and 1.0, both inclusive. The back-end service level for each back-end application, for example, B1s1, B2s1, B3s1, etc., may be assigned a value of 1.0 if the back-end application is connected and functioning normally. Otherwise, it may be assigned a value of 0.0 when the connection to/from the back-end application may be broken, a total number of timeouts per second exceeds a maximum threshold value that is preconfigured and/or predetermined, the average response time has exceeded a maximum threshold value of response time, and/or a total number of transaction failures when exceeds a preconfigured and/or predetermined maximum threshold value.

In some embodiments, by way of a non-limiting example, the overall service level determining algorithm may be based on an average of summation of the back-end service level multiplied by the back-end weight for a plurality of the back-end applications. Accordingly, the overall service level determining algorithm may be represented by the following equation:

$$\text{service level} = (B1wt*B1s1 + B2wt*B2s2 + \ldots + BNwt*BNS1)/(B1wt + B2wt + \ldots + BNwt)$$

In some embodiments, after the service level value is determined, the service level value may be communicated for determining routing a request of a plurality of requests to a server of a plurality of servers 104-110 using a health check application-programming interface (API). The health check API may use JavaScript Object Notation (JSON). By way of a non-limiting example, the JSON API message communicating the service level may be as follows:

```
{
  "Timestamp": "2020-08-03T16:55:38.297Z",
  "serviceLevel": 1,
  ...
  "backends": {
    "backend-1": {
      "serviceLevel": 1,
      "connected": true,
      "signedOn": true,
      "healthy": true,
      ...
      "maintenanceMode": false
    },
    "backend-2": {
      "serviceLevel": 1,
      "connected": true,
      "signedOn": true,
      "healthy": false,
      ...
      "maintenanceMode": false
    },
    ...
  }
}
```

The JSON API message may vary depending on implementation; however, each JSON API message may include the top-level service level and the back-end health results.

In some embodiments, an application server determining routing or distribution of one or more requests from a client of a plurality of clients may use a suppression logic, which utilizes metrics collected by the health check API. Upon determining the service level is below 1.0 for a server of a plurality of servers, the server with the service level value below 1.0 may be considered an unhealthy instance. The application server may prevent routing of the one or more requests to the unhealthy instance. The suppression module may generate the Sign-Off message to indicate a particular server has a service level value of less than a specific predetermined threshold value, for example, 0.8. Upon determining, based on the service level value returning a value above the specific threshold value of the service level, for example, 0.8, the server may be again placed in the active pool of servers by sending a Sign-On message.

In some embodiments, by way of a non-limiting example, a minimum number of servers for the service may be required. Accordingly, the server with a service level value below a specific threshold value, for example, 0.8, may still be kept in service, but with the limited functionality.

In some embodiments, the server placed in the inactive state because of the service level with a value below a threshold value may still have an active socket connection with the client. However, idle socket connection may be closed in accordance with the configuration. The Sign-On and Sign-Off API messages may be secure HTTPS GET message, REST web services, etc.

In some embodiments, the server may be placed in maintenance mode for the scheduled or unscheduled maintenance using Sign-Off message. By way of a non-limiting example, a maintenance API messages with a message structure similar to other API messages or the Sign-On and the Sign-Off messages' maintenance mode with True or False status may be used to indicate whether a server is being placed in a scheduled or unscheduled maintenance. Accordingly, service may be provided without interruptions by routing request messages from a client 102 to the healthy instance of the servers.

Figure 2:
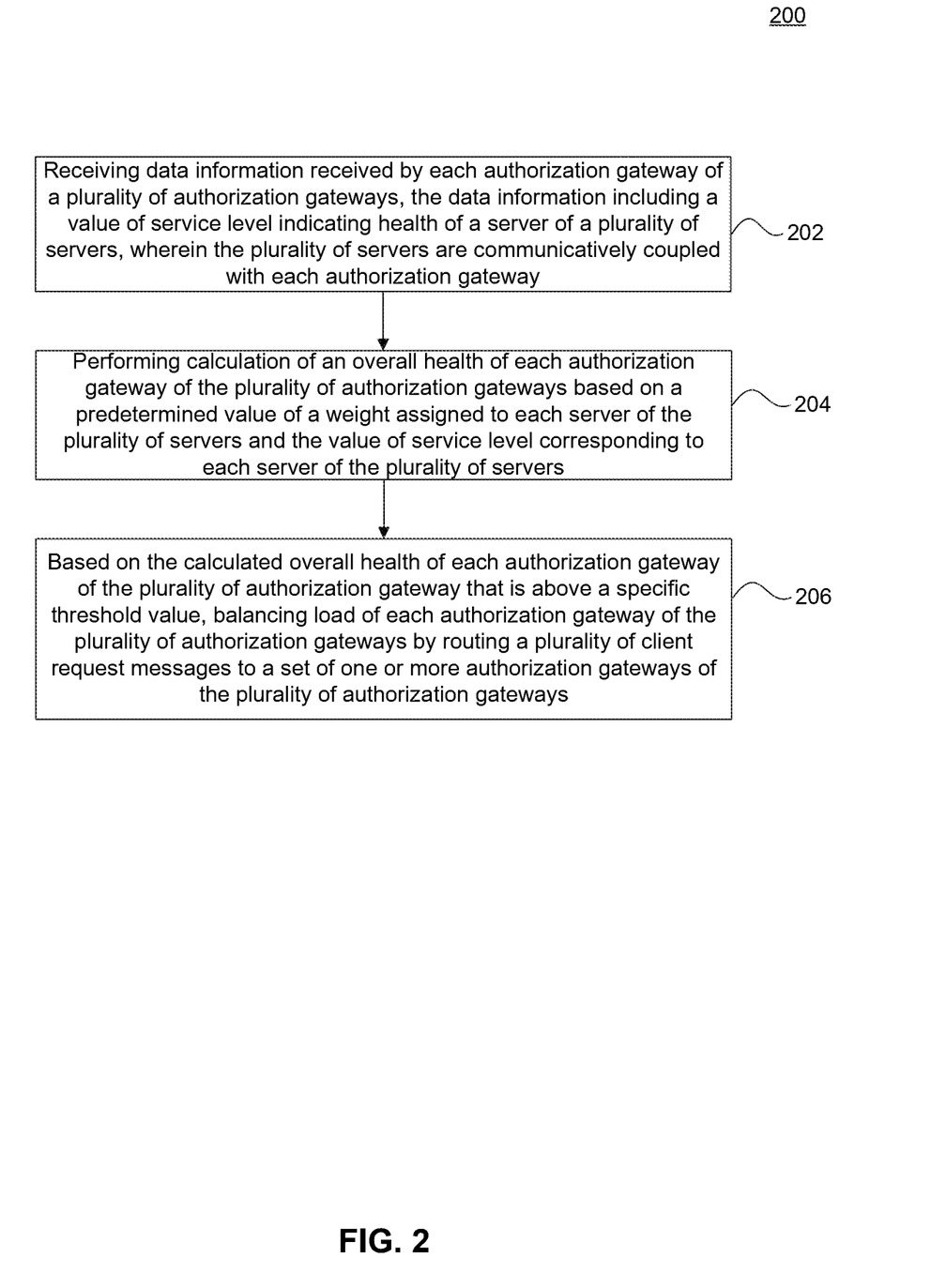
FIG. 2 is a flowchart illustrating a method for measuring health of various nodes of the example network environment, according to some embodiments.

FIG. 2 is a flowchart illustrating a method for health measurement of various nodes of the example network environment, according to some embodiments. The method steps may be performed by an application server, which may notify a merchant of the plurality of merchants a status of an authorization gateway application instance using the Sign-On and Sign-Off request messages, as discussed above, such that the merchant may send credit card authorization requests to appropriate authorization gateway application instances.

At step 202, an authorization gateway of a plurality of authorization gateways may receive data information via an application programming interface (API). The plurality of authorization gateways may be servers server1-server4 104-110. The data information may include a value of a service level indicating the health of a back-end component of a plurality of back-end components 112-118. Each back-end component may be connected to the authorization gateway, as described above with reference to FIG. 1. As stated above, each back-end component may specify their health information using the JSON API message described above. The health information using the JSON API message may include a service level value, TCP/IP socket connection status of the back-end component with the particular authorization gateway instance, maintenance mode value, and other health information that may affect functional capabilities of the back-end component. The back-end component may be any one of the 112, 114, 116, and 118, as shown in FIG. 1.

The value of the service level may be based on various factors, which includes average response time of the communication between the back-end component and the authorization gateway application instance, a number of transaction failures over a predetermined time period that is above a preconfigured threshold count, communication connection status, and a number of timeouts per second that exceeds a preconfigured maximum threshold value.

At step 204, based on the value of service level for each back-end component and predetermined weightage value assigned to each back-end component, each authorization gateway application instance's overall health may be calculated based on the service level for each back-end components and its corresponding weightage. The value of the service level may be 0, 1, or a value between 0 and 1. The predetermined weightage value may be 0, 1, or a value between 0 and 1. As described above with reference to FIG. 1, each authorization gateway application instance is connected to a plurality of back-end components. By way of a non-limiting example, an overall health of the authorization gateway application may thus be determined based on an average of summation of the service level value of a back-end component multiplied by the back-end weight for a plurality of the back-end applications.

At step 206, based on each authorization gateway's calculated overall health that is above a specific predetermined threshold value of a service level, the authorization gateway may be added in a pool of the active servers. Accordingly, requests from a client 102 may be routed to any server of the plurality of servers 104, 106, 108, and/or 110. By way of a non-limiting example, requests from a plurality of clients may be load balanced among a plurality of servers 104-110.

By way of a non-limiting example, upon receiving a message from an authorization gateway application instance with a value of a service level below a predetermined threshold value and/or in maintenance mode, the authorization gateway application instance may be removed from the pool of active servers. By way of a non-limiting example, if the total number of back-end components reporting the service level value less than 1 is above a preconfigured threshold value, the authorization gateway application instance may be removed from the pool of active servers. After an authorization gateway application instance has been removed from the pool of active servers, upon receiving a message from an authorization gateway application instance with a value of a service level above a predetermined threshold value and/or indicating that the back-end components is not in maintenance mode, the authorization gateway application instance may be added to the pool of active servers.

Figure 3:
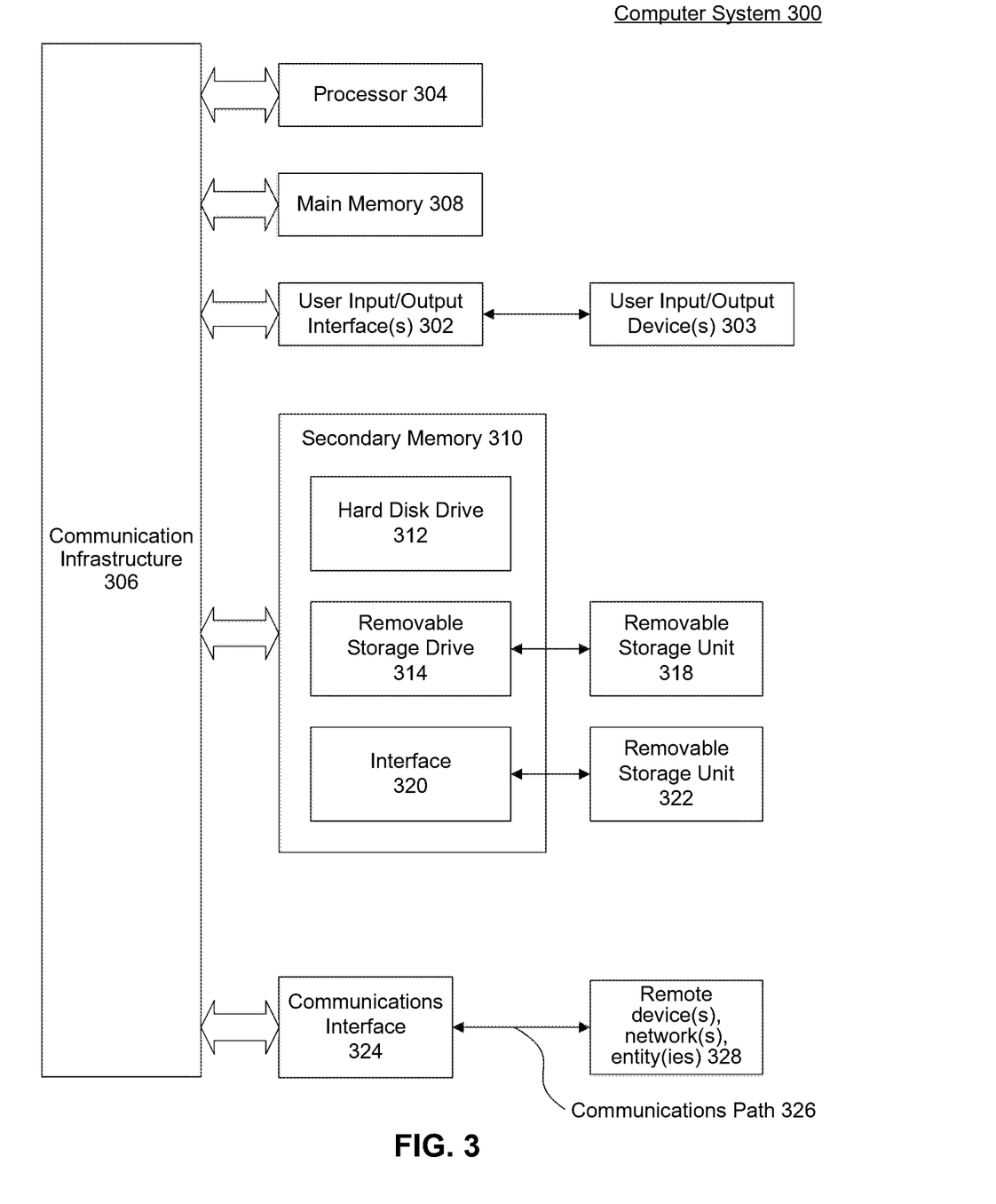
FIG. 3 illustrates an example computing system, according to some embodiments.

FIG. 3 illustrates an example computing system in accordance with some embodiments. Various embodiments may be implemented, for example, using one or more well-known computing systems, such as a computing system 300, as shown in FIG. 3. One or more computing systems 300 may be used, for example, to implement any of the embodiments discussed herein, as well as combinations and sub-combinations thereof. The computing systems 300 may be an authorization gateway application instance or a server of 104, 106, 108, and 110, a backend component of 112, 114, 116, and 118, and/or a client 102, may be used for the implementation of one or more embodiments described above.

The computing system 300 may include one or more processors (also called central processing units, or CPUs), such as a processor 304. The processor 304 may be connected to a communication infrastructure or bus 306.

The computing system 300 may also include user input/output device(s) 303, such as monitors, keyboards, pointing devices, etc., which may communicate with communication infrastructure 306 through user input/output interface(s) 302.

One or more processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computing system 300 may also include a main or primary memory 308, such as random access memory (RAM). Main memory 308 may include one or more levels of cache. Main memory 308 may have stored therein control logic (i.e., computer software) and/or data.

The computing system 300 may also include one or more secondary storage devices or memory 310. The secondary memory 310 may include, for example, a hard disk drive 312 and/or a removable storage device or drive 314. The removable storage drive 314 may be a floppy disk drive, a magnetic tape drive, a compact disk drive, an optical storage device, tape backup device, and/or any other storage device or storage drive.

The removable storage drive 314 may interact with a removable storage unit 318. The removable storage unit 318 may include a computer-usable or readable storage device having stored thereon computer software (control logic) and/or data. The removable storage unit 318 may be a floppy disk, magnetic tape, compact disk, DVD, optical storage disk, and/any other computer data storage device. The removable storage drive 314 may read from and/or write to the removable storage unit 318.

The secondary memory 310 may include other means, devices, components, instrumentalities, or other approaches for allowing computer programs and/or other instructions and/or data to be accessed by the computing system 300. Such means, devices, components, instrumentalities, or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computing system 300 may further include a communication or network interface 324. The communication interface 324 may enable the computing system 300 to communicate and interact with any combination of external devices, external networks, external entities, etc. (individually and collectively referenced by reference number 328). For example, the communication interface 324 may allow the computing system 300 to communicate with the external or remote devices 328 over communications path 326, which may be wired and/or wireless (or a combination thereof), and which may include any combination of LANs, WANs, the Internet, etc. Control logic and/or data may be transmitted to and from the computing system 300 via the communication path 326.

The computing system 300 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

The computing system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), back-end as a service (BaaS), mobile back-end as a service (MBaaS), infrastructure as a service (IaaS), etc.); and/or a hybrid model including any combination of the foregoing examples or other services or delivery paradigms.

Any applicable data structures, file formats, and schemas in the computing system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computing system 300, the main memory 308, the secondary memory 310, and the removable storage units 318 and 322, as well as tangible articles of manufacture embodying any combination of the foregoing. Such control logic, when executed by one or more data processing devices (such as the computing system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method, comprising:
   receiving, at an application server via an application programming interface (API), data information from each of a plurality of authorization gateways, wherein each of the plurality of authorization gateways maintain, even in an inactive state, an exposed TCP socket for receiving credit card authorization requests, a sign-on endpoint, and a health endpoint that is separate from the sign-on endpoint, wherein the data information comprises a value of service level indicating health for each of a plurality of backend servers communicated by each of the plurality of backend servers to the health endpoint of a corresponding authorization gateway;
   performing, by the application server, calculation of an overall health of each authorization gateway of the plurality of authorization gateways based on the value of service level and a predetermined value of a weight assigned to each backend server of the plurality of backend servers communicatively coupled to the health endpoint of a corresponding authorization gateway;
   determining, by the application server, a set of one or more authorization gateways of the plurality of authorization gateways that each have an overall health, determined by the performed calculation, above a specific threshold value;
   placing, by the application server, each of the determined set of one or more authorization gateways into an active pool of authorization gateways by communicating a Sign-On message via the sign-on endpoint of each authorization gateway in the determined set of one or more authorization gateways, wherein each authorization gateway in the active pool of authorization gateways is configured to service a credit card transaction via the exposed TCP socket; and
   routing, by the application server, at least one client request message to an authorization gateway in the active pool of authorization gateways configured to service the credit card transaction.

2. The method of claim 1, wherein the predetermined value of the weight assigned to each backend server is 0, 1, or a value in between 0 and 1.

3. The method of claim 1, wherein the value of service level corresponding to each backend server of the plurality of backend servers is 0, 1, or a value in between 0 and 1.

4. The method of claim 1, further comprising determining the value of service level of a backend server of the plurality of backend servers based on one or more factors including average response time of communication between an authorization gateway of the plurality of authorization gateways and the backend server, a count of transaction failures over a predetermined time period above a preconfigured threshold count, a communication connection status, and a number of timeouts per second that exceeds a preconfigured maximum threshold value.

5. The method of claim 1, further comprising removing, by the application server, an authorization gateway from the active pool of authorization gateways upon determining that a total number of backend servers communicatively coupled with the authorization gateway that report a value of service level less than 1 is above a preconfigured threshold value.

6. The method of claim 1, further comprising removing, by the application server, an authorization gateway from the active pool of authorization gateways upon receiving a Sign-Off message from the authorization gateway indicating the authorization gateway is in a maintenance mode or a value of service level of the authorization gateway is less than a predetermined threshold value.

7. The method of claim 6, wherein the Sign-Off message from the authorization gateway is based on International Organization for Standardization (ISO) 8583 standard.

8. The method of claim 1, further comprising adding, by the application server, an authorization gateway of the plurality of authorization gateways to the active pool of authorization gateways to service the at least one client request message upon receiving a message from the authorization gateway indicating the authorization gateway is not in a maintenance mode or a value of service level of the authorization gateway is above a predetermined threshold value.

9. The method of claim 1, wherein the Sign-On message comprises a network management information code specifying a type of credit card transaction, and each authorization gateway in the active pool of authorization gateways is configured to service a credit card transaction that matches the type of credit card transaction specified by the network management information code in the Sign-On message.

10. A system, comprising:
an application server comprising:
a memory configured to store operations; and
one or more processors configured to perform the operations;
a plurality of authorization gateways communicating with the application server via an application programming interface; and
a plurality of backend servers communicatively coupled with each authorization gateway of the plurality of authorization gateways,
wherein the application server is configured to perform the operations comprising:
receiving data information from each of the plurality of authorization gateways, wherein each of the plurality of authorization gateways maintain, even in an inactive state, an exposed TCP socket for receiving credit card authorization requests, a sign-on endpoint, and a health endpoint that is separate from the sign-on endpoint, wherein the data information comprises a value of service level indicating health for each of the plurality of backend servers communicated by each of the plurality of backend servers to the health endpoint of a corresponding authorization gateway;
performing calculation of an overall health of each authorization gateway of the plurality of authorization gateways based on the value of service level and a predetermined value of a weight assigned to each backend server of the plurality of backend servers communicatively coupled to the health endpoint of a corresponding authorization gateway;
determine a set of one or more authorization gateways of the plurality of authorization gateways that each have an overall health, determined by the performed calculation, above a specific threshold value;
place each of the determined set of one or more authorization gateways into an active pool of authorization gateways by communicating a Sign-On message via the sign-on endpoint of each authorization gateway in the determined set of one or more authorization gateways, wherein each authorization gateway in the active pool of authorization gateways is configured to service a credit card transaction via the exposed TCP socket; and
route at least one client request message to an authorization gateway in the active pool of authorization gateways configured to service the credit card transaction.

11. The system of claim 10, wherein the predetermined value of the weight assigned to each backend server is 0, 1, or a value in between 0 and 1.

12. The system of claim 10, wherein the value of service level corresponding to each backend server of the plurality of backend servers is 0, 1, or a value in between 0 and 1.

13. The system of claim 10, wherein the operations further comprise:
determining the value of service level of a backend server of the plurality of backend servers based on one or more factors including average response time of communication between an authorization gateway of the plurality of authorization gateways and the backend server, a count of transaction failures over a predetermined time period above a preconfigured threshold count, a communication connection status, and a number of timeouts per second that exceeds a preconfigured maximum threshold value.

14. The system of claim 10, wherein the operations further comprise:
removing an authorization gateway of the plurality of authorization gateways from the active pool of authorization gateways upon determining that a total number of backend servers communicatively coupled with the authorization gateway that report a value of service level less than 1 is above a preconfigured threshold value.

15. The system of claim 10, wherein the operations further comprise:
removing an authorization gateway from the active pool of authorization gateways upon receiving a Sign-Off message from the authorization gateway indicating the authorization gateway is in a maintenance mode or a value of service level of the authorization gateway is less than a predetermined threshold value.

16. The system of claim 15, wherein the Sign-Off message from the authorization gateway is based on International Organization for Standardization (ISO) 8583 standard.

17. The system of claim 10, wherein the operations further comprise:
adding an authorization gateway of the plurality of authorization gateways to the active pool of authorization gateways to service the at least one client request message upon receiving a message from the authorization gateway indicating the authorization gateway is not in a maintenance mode or a value of service level of the authorization gateway is above a predetermined threshold value.

18. The system of claim 10, wherein the Sign-On message comprises a network management information code specifying a type of credit card transaction, and each authorization gateway in the active pool of authorization gateways is configured to service a credit card transaction that matches the type of credit card transaction specified by the network management information code in the Sign-On message.

19. A non-transitory, tangible computer-readable device having instructions stored thereon that, when executed by at least one computing device, cause the at least one computing device to perform operations comprising:

receiving data information from each of a plurality of authorization gateways, wherein each of the plurality of authorization gateways maintain, even in an inactive state, an exposed TCP socket for receiving credit card authorization requests, a sign-on endpoint, and a health endpoint that is separate from the sign-on endpoint, wherein the data information comprises a value of service level indicating health for each of a plurality of backend servers communicated by each of the plurality of backend servers to the health endpoint of a corresponding authorization gateway;

performing calculation of an overall health of each authorization gateway of the plurality of authorization gateways based on the value of service level and a predetermined value of a weight assigned to each backend server of the plurality of backend servers communicatively coupled to the health endpoint of a corresponding authorization gateway;

determining a set of one or more authorization gateways of the plurality of authorization gateways that each have an overall health, determined by the performed calculation, above a specific threshold value;

placing each of the determined set of one or more authorization gateways into an active pool of authorization gateways by communicating a Sign-On message via the sign-on endpoint of each authorization gateway in the determined set of one or more authorization gateways, wherein each authorization gateway in the active pool of authorization gateways is configured to service a credit card transaction via the exposed TCP socket; and routing at least one client request message to an authorization gateway in the active pool of authorization gateways configured to service the credit card transaction.

20. The non-transitory, tangible computer-readable device of claim 19, wherein the operations further comprise:

determining the value of service level of a backend server of the plurality of backend servers based on one or more factors including average response time of communication between an authorization gateway of the plurality of authorization gateways and the backend server, a count of transaction failures over a predetermined time period above a preconfigured threshold count, a communication connection status, and a number of timeouts per second that exceeds a preconfigured maximum threshold value, wherein the value of service level of the backend server is 0, 1, or a value in between 0 and 1, and wherein the predetermined value of the weight assigned to the backend server is 0, 1, or a value in between 0 and 1.

* * * * *